United States Patent
Tanabe et al.

(10) Patent No.: US 8,899,047 B2
(45) Date of Patent: Dec. 2, 2014

(54) GAS TURBINE POWER PLANT HAVING FUEL HEATING MEANS

(75) Inventors: Hiroshi Tanabe, Tokyo (JP); Eiki Anzawa, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 322 days.

(21) Appl. No.: 13/163,942

(22) Filed: Jun. 20, 2011

(65) Prior Publication Data

US 2012/0137693 A1 Jun. 7, 2012

(30) Foreign Application Priority Data

Dec. 3, 2010 (JP) ................................. 2010-270615

(51) Int. Cl.
| | | |
|---|---|---|
| *F02C 1/00* | (2006.01) | |
| *F02G 3/00* | (2006.01) | |
| *F02C 3/20* | (2006.01) | |
| *F02C 7/22* | (2006.01) | |
| *F02C 7/224* | (2006.01) | |

(52) U.S. Cl.
CPC ... *F02C 3/20* (2013.01); *F02C 7/22* (2013.01); *F05D 2220/75* (2013.01); *F02C 7/224* (2013.01); *F05D 2260/15* (2013.01)
USPC ............ 60/734; 60/736; 60/737; 60/739; 60/39.461; 60/39.463; 60/39.465; 60/39.281

(58) Field of Classification Search
USPC ............ 60/734, 736, 737, 39.461, 39.463, 60/39.465, 39.281, 739
See application file for complete search history.

(56) References Cited

U.S. PATENT DOCUMENTS

| | | | |
|---|---|---|---|
| 6,345,495 B1 * | 2/2002 | Cummings | 60/39.465 |
| 6,422,809 B1 | 7/2002 | Filippov et al. | |
| 6,655,906 B1 * | 12/2003 | Yuri et al. | 415/1 |
| 2003/0223855 A1 | 12/2003 | Yuri et al. | |
| 2009/0315230 A1 * | 12/2009 | Harada | 266/44 |

FOREIGN PATENT DOCUMENTS

| | | | |
|---|---|---|---|
| DE | 3700153 A1 | 7/1987 | |
| EP | 0550801 A2 | 7/1993 | |
| EP | 1206626 B1 | 5/2006 | |
| JP | 09-079046 A | 3/1997 | |
| JP | 0979046 A * | 3/1997 | F02C 9/48 |
| JP | 2002-516943 A | 6/2002 | |
| JP | 2009-185612 A | 8/2009 | |

OTHER PUBLICATIONS

International Search Report of PCT/JP2011/062971, date of mailing Jul. 12, 2011.

(Continued)

*Primary Examiner* — Craig Kim
(74) *Attorney, Agent, or Firm* — Westerman, Hattori, Daniels & Adrian, LLP

(57) ABSTRACT

Provided is a power plant including a gas turbine that uses a fuel gas as a fuel; a fuel gas cooler that cools the fuel gas, which is to be pressurized in a fuel gas compressor and re-circulated, using cooling water; and a dust collection device that separates/removes impurities from the fuel gas that is to be guided to the fuel gas compressor; wherein the power plant further includes heating means that heats the fuel gas that is to be guided to the dust collection device using the fuel gas that has been used to generate an anti-thrust force acting on a rotor of the fuel gas compressor.

4 Claims, 2 Drawing Sheets

(56) References Cited

OTHER PUBLICATIONS

Decision to Grant a Patent dated Aug. 13, 2013, issued in Japanese Patent Application No. 2010-270615.
Office Action issued on Nov. 5, 2013 in corresponding Chinese Patent Application No. 201180037641.9. English Translation.
Extended European Search Report dated Feb. 3, 2014, issued in corresponding European Patent Application No. 11844148.4.
Korean Notice of Allowance dated Jan. 17, 2014, issued in corresponding Korean Patent Application No. 10-2013-7002580. (Notice of Allowance has been received).
Decision to Grant a Patent dated May 6, 2014, issued in a Corresponding Chinese Patent Application No. 201180037641.9, Decision to Grant a Patent has been received (2 pages).

* cited by examiner

GAS TURBINE POWER PLANT HAVING FUEL HEATING MEANS

CROSS REFERENCE TO RELATED APPLICATIONS

This application claims benefit of Japanese Application No. 2010-270615 filed in Japan on Dec. 3, 2010, the contents of which are hereby incorporated by its reference.

BACKGROUND OF THE INVENTION

1. Field of the Invention

The present invention relates to a power plant provided with a gas turbine, which uses a low-heating-value gas, such as blast furnace gas (BFG), as a fuel, and a fuel gas cooler that cools fuel gas pressurized in a fuel gas compressor and re-circulated.

2. Description of Related Art

Known power plants provided with a gas turbine, which uses a low-heating-value gas, such as blast furnace gas (BFG), as a fuel, and a fuel gas cooler that cools fuel gas pressurized in a fuel gas compressor and re-circulated include, for example, that disclosed in FIG. 1 in Japanese Unexamined Patent Application, Publication No. Hei 9-79046.

In the case where the power plant disclosed in FIG. 1 of the above-mentioned Japanese Unexamined Patent Application, Publication No. Hei 9-79046 is used in a location where the temperature of the fuel gas can become 5° C. or lower, such as a cold region etc., there is a risk that ice may be formed on a dust collector (dust collection device) 5, causing abnormal discharge of the dust collector 5, and that the ice formed on the dust collector 5 may be scattered toward a fuel gas compressor 6 located downstream, which may damage blades of the fuel gas compressor 6. Therefore, if the power plant disclosed in FIG. 1 of the above-mentioned Japanese Unexamined Patent Application, Publication No. Hei 9-79046 is used in a location where the outside temperature can become 5° C. or lower, such as a cold region etc., the fuel gas that has passed through a fuel gas cooler 16 is supplied to an intermediate position in piping (fuel gas supply system) that guides the fuel gas, which has been mixed and adjusted in a mixing chamber 4 so as to have a suitable heating value, to the dust collector 5, thereby intentionally increasing the temperature of (heating) the fuel gas flowing through the piping.

However, if the gas turbine is operated at the rated output, only a small amount of fuel gas is bypassed to the fuel gas cooler 16. Therefore, in such a case, there has been a problem in that the power generation level is limited because it is required to forcedly reduce the output of the gas turbine (i.e., the power generation level) to generate the fuel gas that is to be bypassed to the fuel gas cooler 16, thereby increasing the temperature of (heating) the fuel gas that is passing through the piping with the fuel gas supplied from the fuel gas cooler 16.

BRIEF SUMMARY OF THE INVENTION

The present invention has been conceived in light of the circumstances described above, and an object thereof is to provide a power plant that is capable of increasing the temperature of (heating) a fuel gas that is to be guided to a dust collection device without reducing the output of a gas turbine.

In order to solve the problems described above, the present invention employs the following solutions.

The power plant according to the present invention includes a gas turbine that uses a fuel gas as a fuel; a fuel gas cooler that cools the fuel gas, which is to be pressurized in a fuel gas compressor and re-circulated, using cooling water; and a dust collection device that separates/removes impurities from the fuel gas that is to be guided to the fuel gas compressor; wherein the power plant further includes heating means that heats the fuel gas that is to be guided to the dust collection device using the fuel gas used to generate an anti-thrust force acting on a rotor of the fuel gas compressor.

With the power plant according to the present invention, regardless of the output of the gas turbine, the fuel gas used to generate the anti-thrust force acting on the rotor of the fuel gas compressor is used to increase the temperature of (heat) the fuel gas that is to be guided to the dust collection device.

By doing so, it is possible to increase the temperature of (heat) the fuel gas that is to be guided to the dust collection device without reducing the output of the gas turbine.

In addition, by increasing the temperature of (heating) the fuel gas that is to be guided to the dust collection device, it is possible to prevent ice from forming on the dust collection device, thereby preventing an abnormal discharge of the dust collection device.

Further, it is possible to increase the temperature of (heat) the fuel gas that is to be guided to the dust collection device to control the temperature of the fuel gas flowing into the fuel gas compressor within the desired range (for example, within the range from 20° C. to 30° C.), and it is possible to widen the outside temperature range at which there is no reduction in the compressor efficiency of the fuel gas compressor.

In the above-mentioned power plant, the heating means may be provided with a nozzle that injects the fuel gas, guided from a balancing chamber in the fuel gas compressor, into the fuel gas that is to be guided to the dust collection device.

With such a power plant, the fuel gas that has been used to generate the anti-thrust force acting on the rotor of the fuel gas compressor and that has reached the balancing chamber of the fuel gas compressor is sprayed (directly) through the nozzle into the fuel gas flowing towards the dust collection device, thereby (directly) warming up the fuel gas flowing towards the dust collection device.

By doing so, a heat exchange device (heat exchanger) that has a complex structure and unavoidably large contact area and flow resistance (pressure loss) does not need to be arranged at the upstream side of the dust collection device; therefore, it is possible to achieve a simple structure and to minimize the increase in the flow resistance (pressure loss).

With such a power plant according to the present invention, an advantage is afforded in that it is possible to increase the temperature of (heat) the fuel gas that is to be guided to the dust collection device without reducing the output of the gas turbine by effectively using a thrust-balancing gas that is conventionally discharged to a fuel gas cooler and whose waste heat is exhausted after being used to generate the anti-thrust force.

DETAILED DESCRIPTION OF THE INVENTION

A power plant according to an embodiment of the present invention will be described below with reference to FIGS. 1 and 2.

Figure 1:
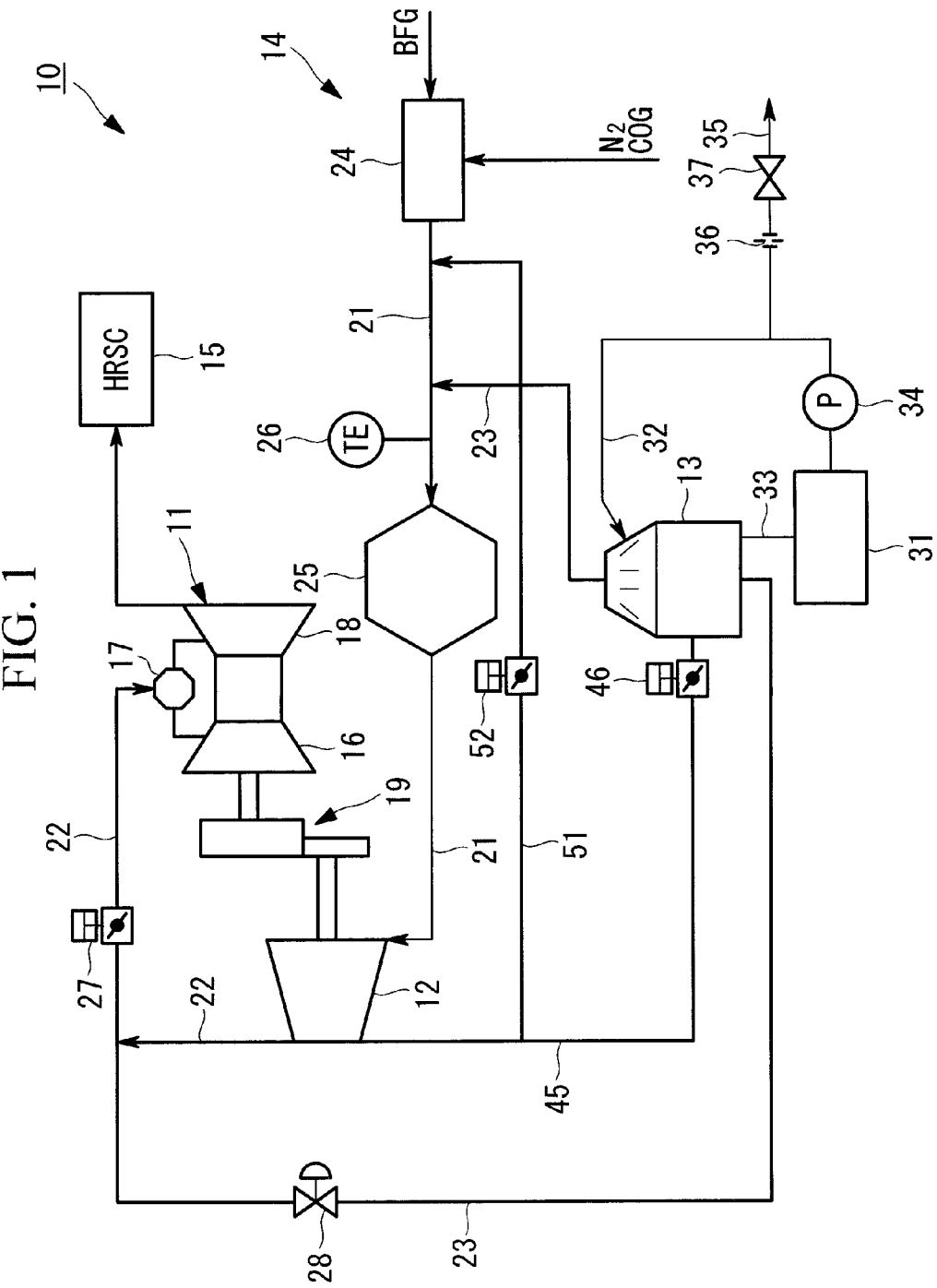
FIG. 1 is a schematic structural diagram of a power plant according to an embodiment of the present invention.
Figure 2:
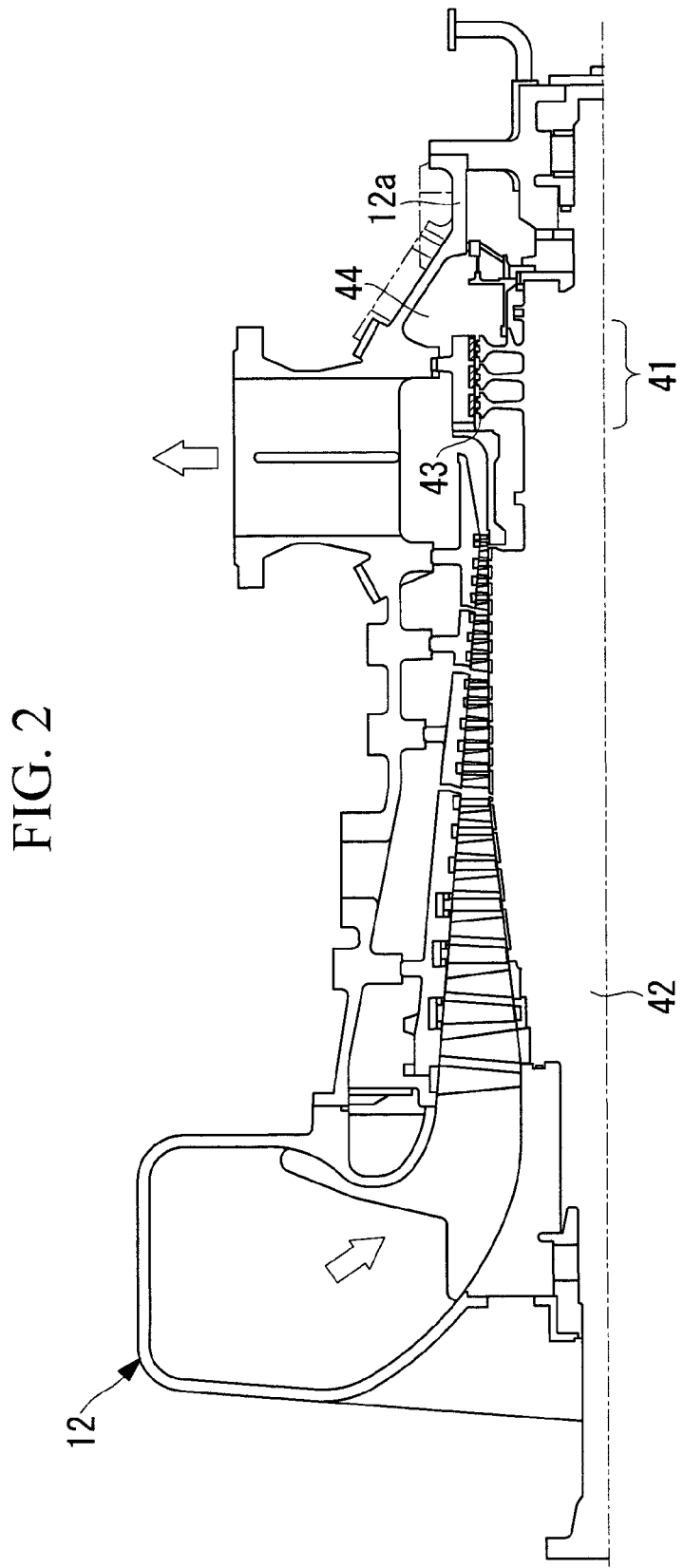
FIG. 2 is a cross-sectional diagram of the BFG compressor shown in FIG. 1.

FIG. 1 is a schematic structural diagram of a power plant according to this embodiment, and FIG. 2 is a cross-sectional diagram of the BFG compressor shown in FIG. 1.

As shown in FIG. 1, a power plant 10 according to this embodiment is provided with a gas turbine 11, a BFG compressor (fuel gas compressor) 12, a generator (not shown), a fuel gas cooler (hereinafter referred to as "gas cooler") 13, a BFG (blast furnace gas) supply system 14, a COG (coke-oven gas) supply system (not shown), and an HRSG (exhaust heat recovery boiler) 15.

The gas turbine 11 is provided with an air compressor 16, a (gas turbine) combustor 17, and a turbine 18. In addition, the gas turbine 11, the BFG compressor 12, and the generator are connected via a speed-reduction mechanism 19, and the BFG compressor 12 and the generator are configured to rotate co-operatively with the rotation of the gas turbine 11.

The BFG supply system 14 is a fuel supply line that guides BFG (low-heating-value fuel gas) to a gas nozzle (not shown) that constitutes the combustor 17, the COG supply system is a fuel supply line that suitably adjusts the heating value of the BFG by mixing COG (high-heating-value fuel gas) with the BFG, and the downstream end of this BFG supply system in which the COG has been mixed is connected to the combustor 17.

The BFG supply system 14 is provided with an upstream line 21 that guides the BFG generated in a blast furnace (not shown) to the BFG compressor 12, a downstream line 22 that guides the BFG that has been compressed in the BFG compressor 12 (that has been sent out (discharged) from the BFG compressor 12) to the gas nozzle, and a bypass line 23 that communicates between an intermediate position in the upstream line 21 and an intermediate position in the downstream line 22 to return the BFG passing through the downstream line 22 to the upstream line 21 as required.

The upstream line 21 is provided with, at intermediate positions therein, a mixing chamber 24 that mixes heating-value-adjusting gas (for example, N2 for reducing the heating value and/or COG for increasing the heating value) with the BFG that has been guided from the blast furnace such that the BFG is adjusted to have a suitable heating value, a dust collection device (for example, wet type electric dust collector (Electrostatic Precipitator)) 25 that separates/removes fine particles (impurities), such as fine dust, from the BFG that is to be guided to the BFG compressor 12 from the mixing chamber 24, and a (first) temperature detector 26 that detects the temperature of the BFG flowing into the dust collection device 25.

In addition, a shut-off valve 27 is provided at an intermediate position in the downstream line 22.

The bypass line 23 is provided with, at intermediate positions therein, a bypass valve (flow regulating valve) 28 that adjusts the amount of BFG that is returned (extracted) from an intermediate position in the downstream line 22 to an intermediate position in the upstream line 21 located between the mixing chamber 24 and the dust collection device 25, and the gas cooler 13 that is positioned downstream of the bypass valve 28 and cools the BFG that is returned (extracted) from the intermediate position in the downstream line 22 to the intermediate position in the upstream line 21 located between the mixing chamber 24 and the dust collection device 25.

The gas cooler 13 is provided with a cooling-water supply pipe 32 that guides cooling water pooled in a cooling-water pit 31 to a spray nozzle (not shown) arranged inside the gas cooler 13, a hopper (not shown) that collects the cooling water that falls after cooling the BFG by being sprayed from the spray nozzle, and a cooling-water return pipe 33 that guides the cooling water held in the hopper to the cooling-water pit 31. In addition, a cooling-water pump 34 and a cooler (not shown) are provided at intermediate positions in the cooling-water-supply pipe 32.

The level of the cooling water (water level) held in the hopper is maintained (naturally) at a constant level (water level) by a U-shaped pipe (not shown) provided at the most upstream portion of the cooling-water return pipe 33.

A drain line 35 that guides the cooling water pooled in the cooling-water pit 31 to a drain pit (not shown) is connected to the cooling-water supply pipe 32 positioned downstream of a cooler 35, and an orifice 36 and an open/close valve 37, which is normally kept open, are provided at intermediate positions in the drain line 35.

In addition, the discharged water (waste water) pooled in the drain pit is blown out (discharged) from the system through a blow line (not shown) and a blow pump (not shown) as required.

As shown in FIG. 2, balancing discs 41 are provided in the BFG compressor 12, such that the thrust force (force that presses the rotor 42 to the left in FIG. 2 along the axial direction (the left/right direction in FIG. 2)) that is applied to (acts on) the rotor 42 is cancelled (compensated) by an anti-thrust force (force that presses the rotor 42 to the right in FIG. 2 along the axial direction (the left/right direction in FIG. 2)) that is applied to (acts on) the rotor 42. The BFG that has leaked from a labyrinth seal 43 provided on a peripheral portion of the balancing discs 41 flows into a balancing chamber 44 provided (formed) in a casing 12a, and subsequently is returned (brought back) to the intermediate position of the flow path formed within the gas cooler 13 through a BFG return pipe 45 (see FIG. 1).

As shown in FIG. 1, a (first) switching valve 46 is provided at an intermediate position in the BFG return pipe 45, and a BFG-heating line (heating means) 51 that communicates between an intermediate position in the upstream line 21 and an intermediate position in the BFG return pipe 45 and that allows, as required, the BFG passing through the BFG return pipe 45 to flow into the upstream line 21 is connected to the BFG return pipe 45 positioned upstream of the switching valve 46. The downstream end (outlet end) of the BFG-heating line 51 is connected to the upstream line 21 at a position that is downstream of the mixing chamber 24 and is upstream of the position where the downstream end (outlet end) of the bypass line 23 is connected. In addition, a (second) switching valve 52 is provided at an intermediate position in the BFG-heating line 51, and a nozzle (not shown) is provided on the downstream end (outlet end) of the BFG-heating line 51.

The BFG injected from the nozzle (directly) warms up the BFG that is passing (flowing) through the upstream line 21, flows downstream in the upstream line 21 towards the dust collection device 25 together with the BFG that is flowing in the upstream line 21 from the upstream side, flows into the dust collection device 25, and is guided into the BFG compressor 12 after fine particles (impurities), such as fine dust, are separated/removed therefrom in the dust collection device 25.

If the temperature detected by the temperature detector 26 exceeds (is higher than) 5° C., the switching valve 46 is fully opened and the switching valve 52 is fully closed. Once the temperature detected by the temperature detector 26 becomes 5° C. or lower, the switching valve 46 is fully closed and the switching valve 52 is fully opened.

With the power plant 10 according to this embodiment, regardless of the output of the gas turbine 11, the BFG used to generate the anti-thrust force acting on the rotor 42 of the BFG compressor 12 is used to increase the temperature of (heat) the BFG that is to be guided to the dust collection device 25.

By doing so, it is possible to increase the temperature of (heat) the BFG that is to be guided to the dust collection device 25 without reducing the output of the gas turbine 11.

In addition, by increasing the temperature of (heating) the BFG that is to be guided to the dust collection device 25, it is possible to prevent ice from forming on the dust collection device 25, thereby preventing an abnormal discharge of the dust collection device 25.

Further, it is possible to increase the temperature of (heat) the BFG that is to be guided to the dust collection device 25 to control the temperature of the BFG flowing into the BFG gas compressor 12 within the desired range (for example, within the range from 20° C. to 30° C.), and it is possible to widen the outside temperature range at which there is no reduction in the compressor efficiency of the BFG gas compressor 12.

In addition, with the power plant 10 according to this embodiment, the BFG that has been used to generate the anti-thrust force acting on the rotor 42 of the BFG compressor 12 and that has reached the balancing chamber 44 in the BFG compressor 12 is sprayed (directly) through the nozzle into the BFG flowing towards the dust collection device 25, thereby (directly) warming up the BEG flowing towards the dust collection device 25.

By doing so, a heat exchange device (heat exchanger) that has a complex structure and unavoidably large contact area and flow resistance (pressure loss) does not need to be arranged at the upstream side of the dust collection device 25; therefore, it is possible to achieve a simple structure and to minimize the increase in the flow resistance (pressure loss).

The present invention is not limited to the embodiment described above, and appropriate modifications and alterations are possible as required.

For example, in the embodiment described above, the COG (coke-oven gas) and the BFG (blast furnace gas) are described as specific examples of the high-heating-value fuel and the low-heating-value fuel, respectively; however, the type of fuel may include those other than the COG (coke-oven gas) and the BFG (blast furnace gas).

In addition, in the embodiment described above, the downstream end (outlet end) of the BFG-heating line 51 is connected to the upstream line 21 at a position that is downstream of the mixing chamber 24 and is upstream of the position where the downstream end (outlet end) of the bypass line 23 is connected; however, the downstream end (outlet end) of the BFG-heating line 51 may be connected to an intermediate position in the bypass line 23 that communicates between the gas cooler 13 and the upstream line 21.

Furthermore, by arranging, in the vicinity of the inlet (intake port) of the BFG compressor 12, a (second) temperature detector (not shown) that detects the temperature of the BFG that flows into the BFG compressor 12, and by connecting the downstream end (outlet end) of a branch pipe (not shown) branched from the BFG-heating line 51 to an intermediate position in the upstream line 21 that communicates between the dust collection device 25 and the BFG compressor 12, the temperature of the BFG that flows into the BFG compressor 12 may be finely adjusted (controlled) by adjusting the degree of opening of a flow regulating valve (not shown) arranged at an intermediate position in the branch pipe while monitoring the temperature detected by the (second) temperature detector.

By doing so, it is possible to control the temperature of BFG flowing into the BFG gas compressor 12 within the desired range, and to widen the outside temperature range at which there is no reduction in the compressor efficiency of BFG gas compressor 12.

What is claimed is:

1. A power plant comprising:
   a gas turbine that uses a fuel gas as a fuel;
   a fuel gas cooler that cools the fuel gas, which has been compressed by rotation of a rotor in a fuel gas compressor and which is to be re-circulated, using cooling water; and
   a dust collection device that separates/removes impurities from the fuel gas that is to be guided to the fuel gas compressor;
   wherein the rotor of the gas compressor is pushed toward one side along an axial direction of the rotor by a thrust force caused by compressing the fuel gas, and a part of the rotor is configured to be pushed by the compressed fuel toward the other side along the axial direction of the rotor so as to generate on the rotor an anti-thrust force against the thrust force, and
   wherein the power plant further comprises heating means that heats the fuel gas that is to be guided to the dust collection device using the fuel gas that has been used to generate the anti-thrust force.

2. The power plant according to claim 1, wherein the heating means comprises a nozzle that injects the fuel gas, guided from a balancing chamber in the fuel gas compressor, into the fuel gas that is to be guided to the dust collection device.

3. The power plant according to claim 2, further comprising:
   an upstream line for guiding the fuel gas to the dust collection device; and
   a temperature detector for detecting a temperature of the fuel gas which is guided by the upstream line and flows into the dust collection device,
   wherein the nozzle of the heating means is provided in the upstream line at an upstream position relative to the dust collection device, and the heating means has a heating line which guides the fuel gas in the balancing chamber to the nozzle, and a valve provided in the heating line, for controlling a flow rate of the fuel gas in the heating line,
   wherein the heating means controls the opening degree of the valve on the basis of the temperature detected by the temperature detector.

4. The power plant according to claim 3, wherein the heating means has a return pipe connected to the heating line between the balancing chamber and the nozzle, for guiding the fuel gas, which is from the balancing chamber and flowing in the heating line, to the fuel gas cooler, a switching valve for opening and closing the return pipe, and the valve provided in the heating line,
   wherein the heating means makes the switching valve fully opened and makes the valve fully closed when the temperature detected by the temperature detector exceeds a predetermined value, and the heating means makes the switching valve fully closed and makes the valve fully opened when the temperature detected by the temperature detector becomes the predetermined value or lower.

\* \* \* \* \*